United States Patent
Morin

(10) Patent No.: US 8,441,535 B2
(45) Date of Patent: May 14, 2013

(54) SYSTEM AND METHOD FOR INDEPENDENT IMAGE SENSOR PARAMETER CONTROL IN REGIONS OF INTEREST

(75) Inventor: Jeffrey L. Morin, Lincoln Park, MI (US)

(73) Assignee: OmniVision Technologies, Inc., Santa Clara, CA (US)

( * ) Notice: Subject to any disclaimer, the term of this patent is extended or adjusted under 35 U.S.C. 154(b) by 432 days.

(21) Appl. No.: 12/042,998

(22) Filed: Mar. 5, 2008

(65) Prior Publication Data

US 2009/0225189 A1    Sep. 10, 2009

(51) Int. Cl.
*H04N 7/18* (2006.01)
*H04N 5/235* (2006.01)
*G06K 9/00* (2006.01)

(52) U.S. Cl.
USPC .......... 348/148; 348/229.1; 382/104

(58) Field of Classification Search .......... 348/148, 348/149, 207.1, 207.11, 211.4–211.6, 211.14, 348/216.1, 222.1, 229.1, 230.1; 382/104–105
See application file for complete search history.

(56) References Cited

U.S. PATENT DOCUMENTS

| | | | |
|---|---|---|---|
| 5,701,015 A * | 12/1997 | Lungershausen et al. | 250/495.1 |
| 5,949,483 A * | 9/1999 | Fossum et al. | 348/303 |
| 6,509,962 B1 | 1/2003 | Burns, Jr. | |
| 7,106,374 B1 * | 9/2006 | Bandera et al. | 348/308 |
| 7,161,619 B1 * | 1/2007 | Niida et al. | 348/207.11 |
| 7,551,203 B2 * | 6/2009 | Nakayama et al. | 348/222.1 |
| 2003/0163289 A1 * | 8/2003 | Whelan et al. | 702/188 |
| 2007/0242153 A1 | 10/2007 | Tang et al. | |
| 2007/0250898 A1 * | 10/2007 | Scanlon et al. | 725/135 |
| 2008/0166018 A1 * | 7/2008 | Li et al. | 382/105 |

\* cited by examiner

*Primary Examiner* — Daniel M Pasiewicz
(74) *Attorney, Agent, or Firm* — Lathrop & Gage LLP

(57) ABSTRACT

An image sensing systems supports independently setting sensor parameters in two or more different regions of interest. In one implementation resolution, exposure time, and gain are independently selectable in each region of interest. Independently setting exposure time and gain in different regions of interest improves image recognition when there are large differences in the illumination of objects within an image. Independently setting resolution permits the resolution to be selectively increased in regions of interest requiring high resolution in order to reduce the pixel data bandwidth and processing requirements.

22 Claims, 7 Drawing Sheets

SYSTEM AND METHOD FOR INDEPENDENT IMAGE SENSOR PARAMETER CONTROL IN REGIONS OF INTEREST

FIELD OF THE INVENTION

The present invention is generally related to techniques to improve image quality in a region of interest. More particularly, the present invention is directed to improving image quality in multiple regions of interest.

BACKGROUND OF THE INVENTION

There is increasing interest in improving the safety of automobiles using on-board safety systems. One approach in the prior art is the use of radar based collision avoidance systems. For example, a radar based collision avoidance system can provide information on the distance between cars even when there is poor visibility. However, radar based automotive systems can be expensive, with some radar systems costing several thousand dollars.

Image sensors, such as Complementary Metal Oxide Semiconductor (CMOS) image sensors, detect light in the visible and/or infrared wavelengths. Consequently image sensors can also be utilized to improve automobile safety. Conventionally, image sensors have been widely used as in the context of rear-view automobile cameras to assist drivers to safely park their cars. Such rear-view automobile camera applications are inherently designed for low-speed, short distance collision avoidance. In such rear-view camera applications the resolution of the camera and the frame rate can be comparatively low.

Forward-looking camera systems are also of interest to improve automobile safety. Forward looking automobile camera systems, such as that proposed in Pat. Pub. US 2007/0242153, typically include an image recognition process to automatically identify objects within an image and adjust the image sensor parameters across the entire image based on analyzing a region of interest and then readjusting a sensor setting (e.g., gain for the entire image). However, there is substantial vibration and shock in automobiles, which makes it difficult to integrate a zoom lens with a forward looking camera system in a cost effective manner. Consequently, in conventional forward looking automobile camera systems the resolution may be too poor to effectively support many desirable applications. Additionally, prior art forward looking automobile camera systems, such as that disclosed in US 2007/0242153 typically provide only a very limited capability to control a limited subset of sensor parameters (e.g., gain) for the entire image based on analysis of a single region of interest. As a consequence of the combination of these limitations, conventional forward looking automobile camera systems can not be used in a cost-effective manner to support the suite of safety applications that automobile designers desire.

Therefore, what is desired is an improved forward looking image sensing system and method applicable to support automobile safety applications.

SUMMARY OF THE INVENTION

An image sensor includes an array of pixels. The image sensor is designed to permit image sensor parameters to be independently set in two or more different portions of the image sensor. In one implementation resolution, exposure time, and gain are independently selectable in two or more different regions of interest.

One embodiment of an image sensing system includes an image sensor having an array of pixels to capture images. A controller independently sets image sensor parameters in a plurality of regions of interest with the controller selecting default image sensor parameter in other portions of the image outside of the plurality of regions of interest. A processor receives image data from the image sensor and identifies regions of interest. The processor provides control signals to the image sensor to selectively adjust image sensor parameters in each of the plurality of regions of interest.

One embodiment of a method of operating an image sensor includes identifying regions of interest in an image. Each region of interest corresponds to an image recognition detection task. A minimum pixel resolution, pixel exposure time, and pixel gain are selected for each region of interest based on the corresponding image recognition detection task. The minimum pixel resolution, pixel exposure time, and pixel gain are adjusted in each region of interest based on the selection.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
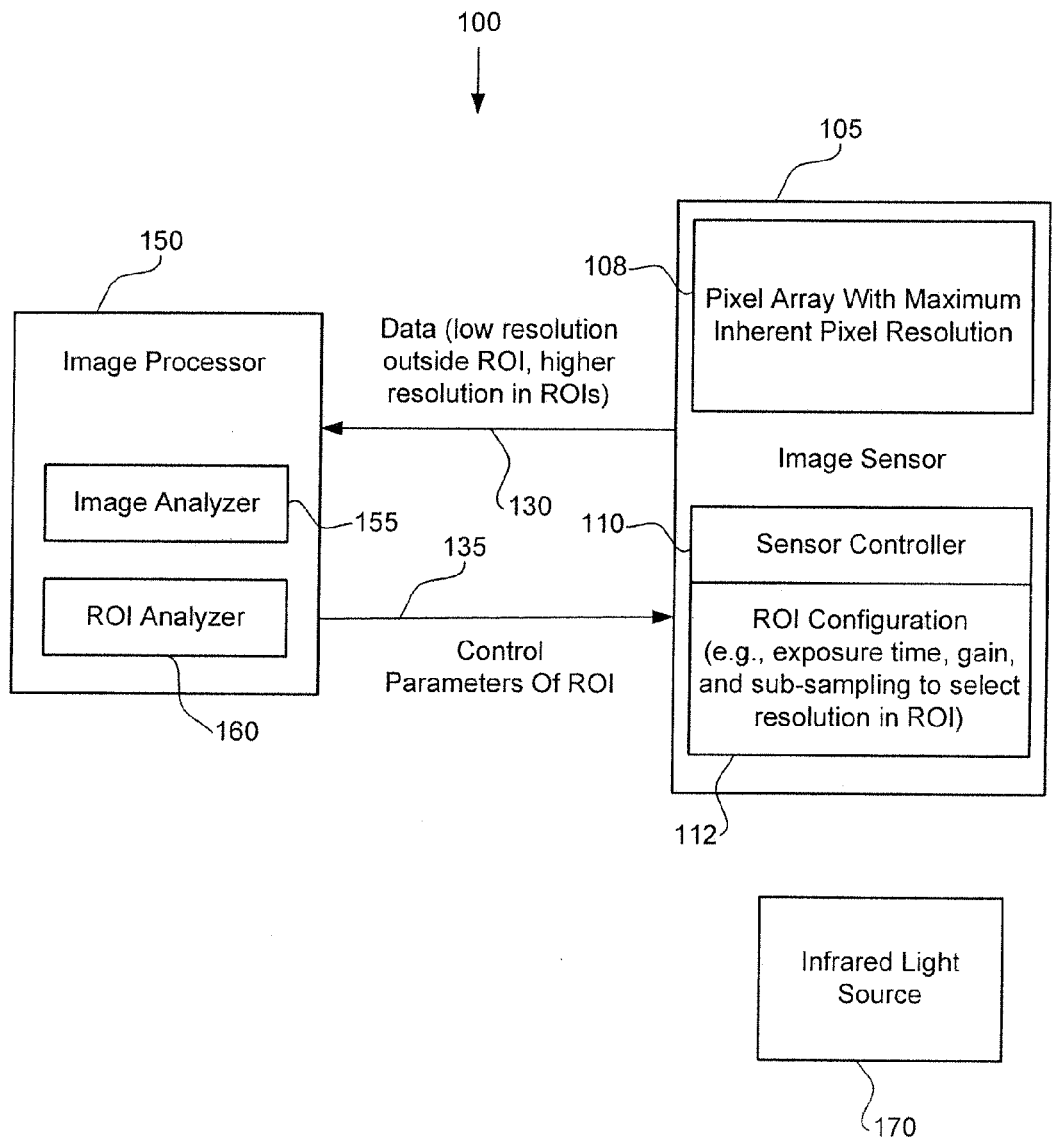
FIG. 1 is a block diagram of an image sensing system in accordance with one embodiment of the present invention.

FIG. 1 illustrates an exemplary image sensing system 100 in accordance with one embodiment of the present invention. An image sensor 105 includes a pixel array 108 with a maximum inherent pixel resolution based on a total maximum number of pixels. As an illustrative example, image sensor 105 may be a CMOS image sensor having a pixel resolution of 4-to-10M pixels or higher when operated in a full resolution mode. An exemplary frame rate for automotive applications is the range of 30-60 frames per second. However, image sensor 105 also supports sub-sampling, i.e., a mode of operation in which data is collected for only a pre-selected fraction of the pixels with, for example one pixel representing a larger group of pixels. As an illustrative example, the sub-sampling frequency may be selected such that the effective resolution is reduced by a factor of 4 to 10.

Operating image sensor 105 at sub-sampling frequencies reduces the power consumption and heat generation of image sensor 105 since the clock rate may be reduced. More importantly, it reduces the pixel data rate on bus 130 (i.e., number of pixels for which data is transported per unit time) sent for processing to image processor 150. This permits, in turn, image processor 150 to have reduced power consumption, heating, and processing requirements. Additionally, reducing the rate at which pixel data is transported on bus 130 reduces bus bandwidth and electromagnetic interference (EMI) shielding requirements for bus 130. In particular, for frame rates of 30-60 frames per second a full high resolution mode for an image processor having 4M-10M pixel resolution would require a substantial image buffer capacity and have stringent electromagnetic compatibility (EMC) requirements requiring more stringent shielding of bus 130.

In one embodiment image sensor 105 has a sensor controller 110 that includes a region of interest (ROI) configuration controller 112. The ROI configuration controller 112 is responsible for setting image sensor parameters such as pixel exposure time, gain, and resolution of the pixels within each ROI. ROI controller 112 may be implemented in hardware, software, or firmware. In one embodiment, two or more different ROIs can each have image sensor parameters independently set to improve image recognition reliability. This permits, for example, exposure time and gain to be independently set for each ROI. Additionally, in one implementation the resolution is independently selected in each ROI. For example, a minimum resolution may be defined in a ROI appropriate to achieve reliable image detection for a selected image recognition task. However, other portions of the same image may have a lower (default) resolution to reduce the average pixel data rate.

A variety of techniques may be used to set the exposure time of pixels across the image sensor. In one implementation, the image sensor 105 sets a default exposure time of pixels across the pixel array 108 using any conventional technique, such as setting the exposure time and gain based on illumination of the image as a whole. However, in a ROI the exposure time and gain is independently set for the illumination within the ROI using, for example, an average based or histogram based technique.

In one embodiment, image processor 150 includes an image analyzer 155 to analyze image data received from image sensor 105. A ROI analyzer 160 identifies ROIs within an image and generates control parameters for each ROI that are sent to sensor controller 110 via bus 135 to adjust sensor parameters in ROIs in subsequent frames. For example, the statistical characteristics of the pixel data within a ROI may be analyzed to determine an adjustment to exposure time and gain to improve image recognition for a particular application. As one example, the resolution may be increased from a low default value to a high maximum value in a ROI based on an image recognition criteria. Alternatively, the resolution may be iteratively increased in steps (over a sequence of frames) based on an analysis of an image recognition criteria by image analyzer 155. For example, if the ROI is a traffic light the resolution could either be step changed to a maximum value or alternatively the resolution gradually increased over a sequence of frames until details of the traffic light were resolvable.

In some applications it is desirable to support an infrared light mode, such as night driving applications. An infrared light source 170 may be included to provide infrared illumination. In this embodiment image sensor 105 would include pixels that are sensitive to infrared. As an illustrative example, in an automotive implementation infrared light source 170 may be used to illuminate the road ahead with infrared light to support image recognition via infrared light.

It will be understood that the division of tasks performed by image analyzer 155 and ROI analyzer 160 may vary depending on implementation details. As an illustrative example, in one embodiment after an initial image analysis in image analyzer 155 is completed a preliminary identification of ROIs is provided to ROI analyzer 160. ROI analyzer 160 then determines image sensor parameter adjustments in each ROI that are required to reliably complete a desired image recognition task, such as adjusting a pixel exposure time, pixel gain, and a minimum resolution in the ROI. According to an embodiment of the present invention, the resolution is selectively increased in one or more regions of interest (ROIs) if required to achieved reliable image detection. For image recognition tasks this is equivalent to performing a zoom operation in a ROI. In many image recognition applications the total area of a ROI is small compared to the total image area. Consequently, by selectively increasing the resolution in ROIs requiring increased resolution the effective (average) pixel data rate on bus 130 is kept at an average level that is much lower than would be the case if the entire image sensor 105 was continuously operated in a full high resolution mode.

Figure 2:
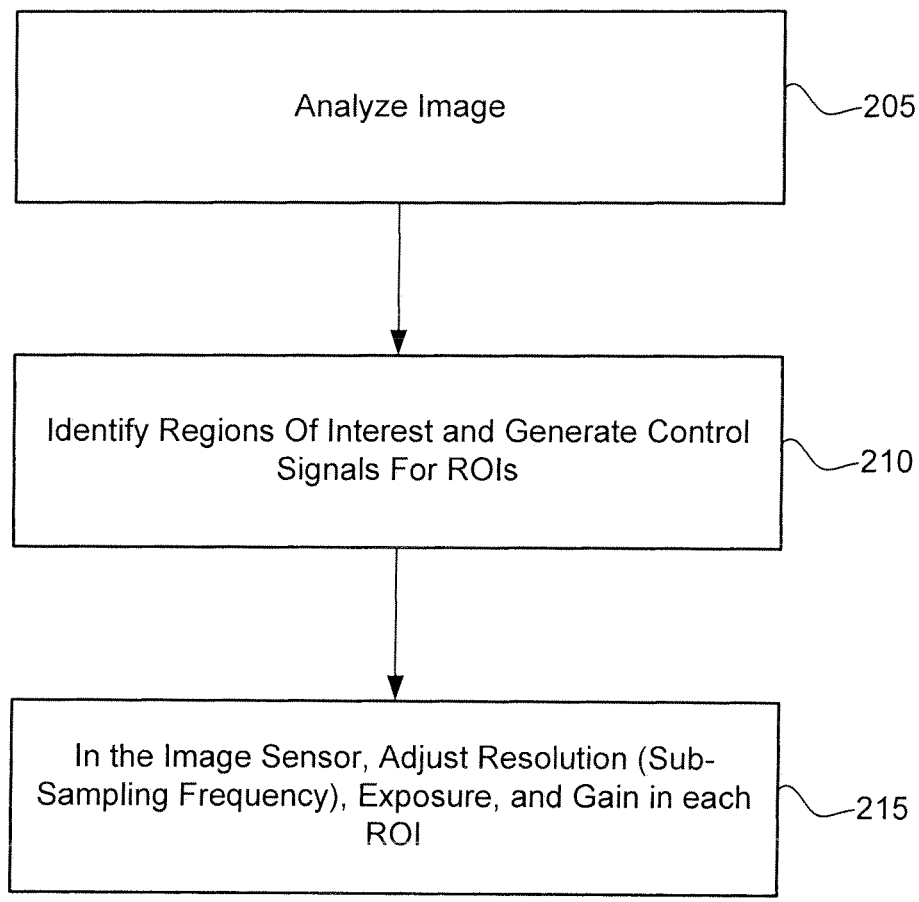
FIG. 2 is a method flow chart in accordance with one embodiment of the present invention.

FIG. 2 is a high-level flow chart illustrating an exemplary process. An image is analyzed in step 205. ROIs are identified and control signals are generated for the ROIs in step 210. In the image sensor the resolution, exposure time, and gain is adjusted for each ROI in step 215.

Figure 3:
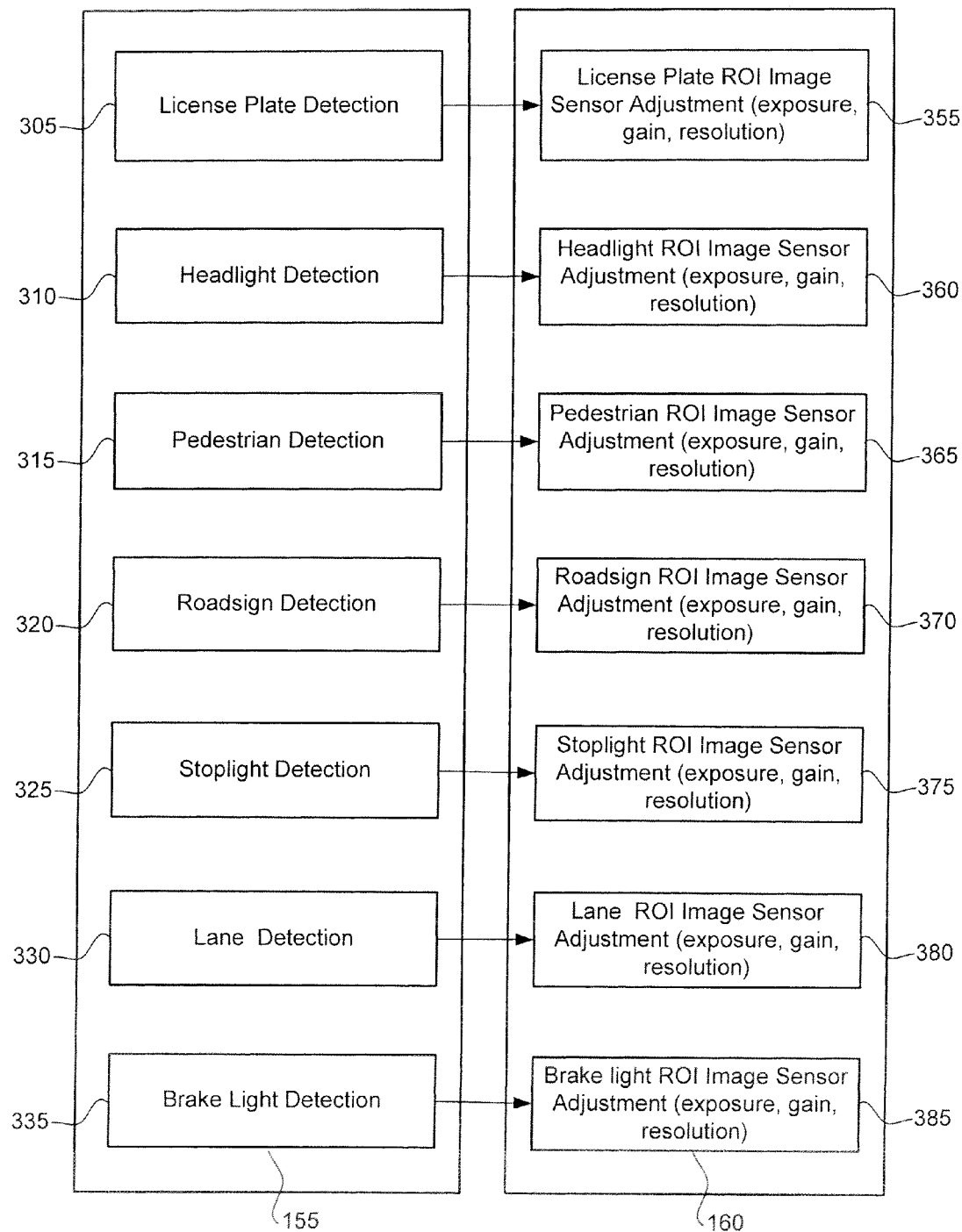
FIG. 3 is a block diagram illustrating sub-modules to support multiple ROIs in accordance with one embodiment of the present invention.

FIG. 3 illustrates exemplary software sub-modules in image processor 150 to support multiple ROIs in a forward looking automobile camera application in accordance with one embodiment of the present invention. In one implementation the software sub-modules are stored in a computer readable memory associated with image analyzer 155 and ROI analyzer 160. In this example, there is a set of image recognition sub-modules, such as a license plate detection sub-module 305, a headlight detection sub-module 310, a pedestrian detection sub-module 315, a road sign detection sub-module 320, a stoplight detection sub-module 325, a lane detection sub-module 330, and a brake light detection sub-module 335. Each of the image recognition sub-modules 310, 315, 320, 325, 330, and 335 may, for example, generate an initial determination of a ROI such as a potential license plate, a potential headlight, a potential pedestrian, a potential road sign, a potential stop light, a potential traffic lane, or a potential brake light based on shape and/or other image recognition considerations. In one implementation the image recognition sub-modules 310, 315, 320, 330, and 335 are associated with the image analyzer 155. ROI image sensor adjustment sub-modules 355, 360, 365, 370, 375, 380, and 385 are provided to independently adjust image sensor parameters (resolution, exposure and/or gain) in each ROI to achieve reliable image recognition. In one implementation the ROI image sensor adjustment sub-modules 355, 360, 365, 370, 375, 380, and 385 are associated with ROI analyzer 160. Note that in the case of multiple ROIs a single exposure time and gain may be inadequate to achieve reliable image recognition if there are different illumination conditions in each ROI. Additionally, note that image recognition is further complicated by the possibility that objects in each ROI may be located at different distances from the image sensor, have different physical sizes and have different minimum required distances for detection. Thus, the minimum required image sensor resolution may differ for each ROI. However, in accordance with the example of FIG. 3, pixel exposure, gain, and a minimum resolution may be independently set in each ROI appropriate to achieve reliable image recognition for a set of different image recognition tasks.

Figure 4:
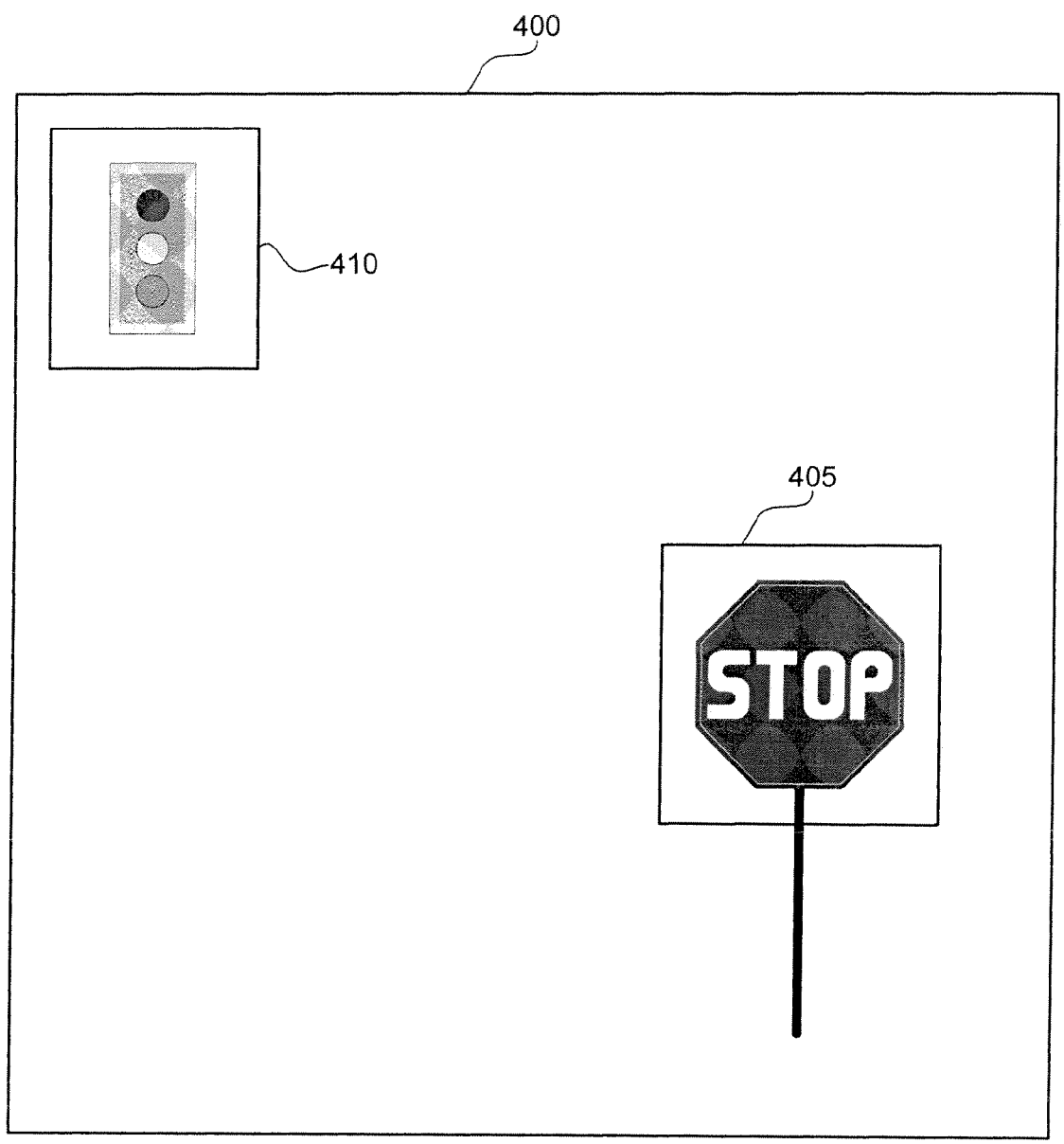
FIG. 4 illustrates two ROIs on an image.

FIG. 4 illustrates an exemplary example in which an image 400 has two ROIs, namely a first ROI 405 corresponding to a stop sign and a second ROI 410 corresponding to a stop light.

In the most general case, the stop sign and the stop light may be at different distances from the image sensor. Additionally, the illumination conditions of the stop sign and the stop light may be quite different from each other, particularly at different times of the day.

Figure 5:
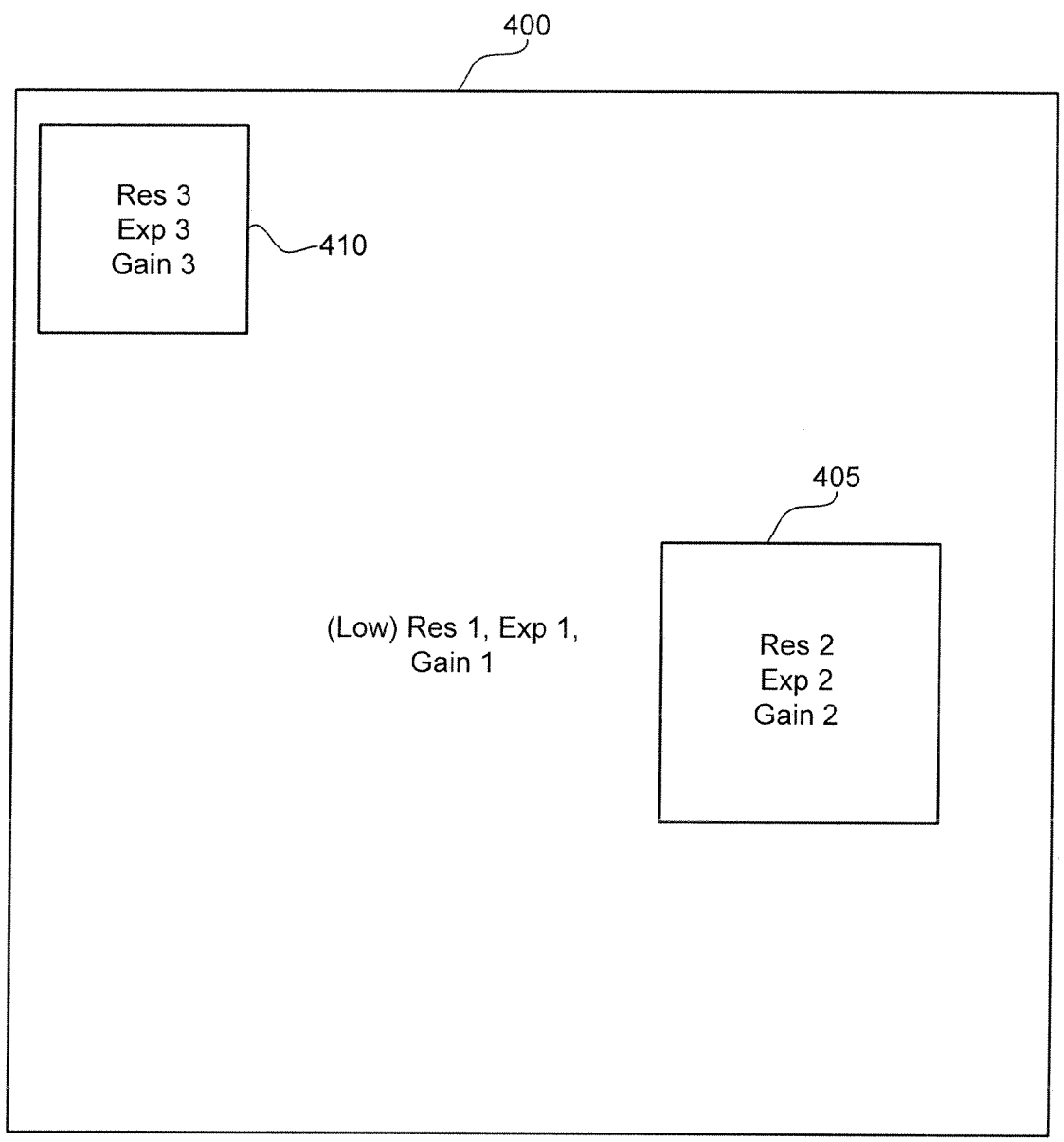
FIG. 5 illustrates independent parameter selection in the ROIs of FIG. 4.

FIG. 5 illustrates the resolution, exposure time, and gain in each ROI of image 400. In most of the image sensor a default exposure time and gain is used along with a default (low) resolution (low res 1, exp 1, gain 1). For example, the default pixel exposure time and default gain may be set based on characteristics of the image as a whole. However, first ROI 405 has its pixel resolution, (Res 2), exposure time (exp 2), and first gain (gain 2) independently selected. Second ROI 410 has a second pixel resolution (Res 3), a second exposure time (exp 3), and a second gain (gain 3) independently selected. Thus, in this example the sensor parameters in each ROI are separately selectable to improve the image recognition reliability of different ROIs. Additionally, as can be seen in this illustrative example, the total area of the ROIs may still be a small fraction of the total image area, thus reducing the amount of pixel data generated compared to the case that the entire image sensor was operated in a full high resolution mode.

Figure 6:
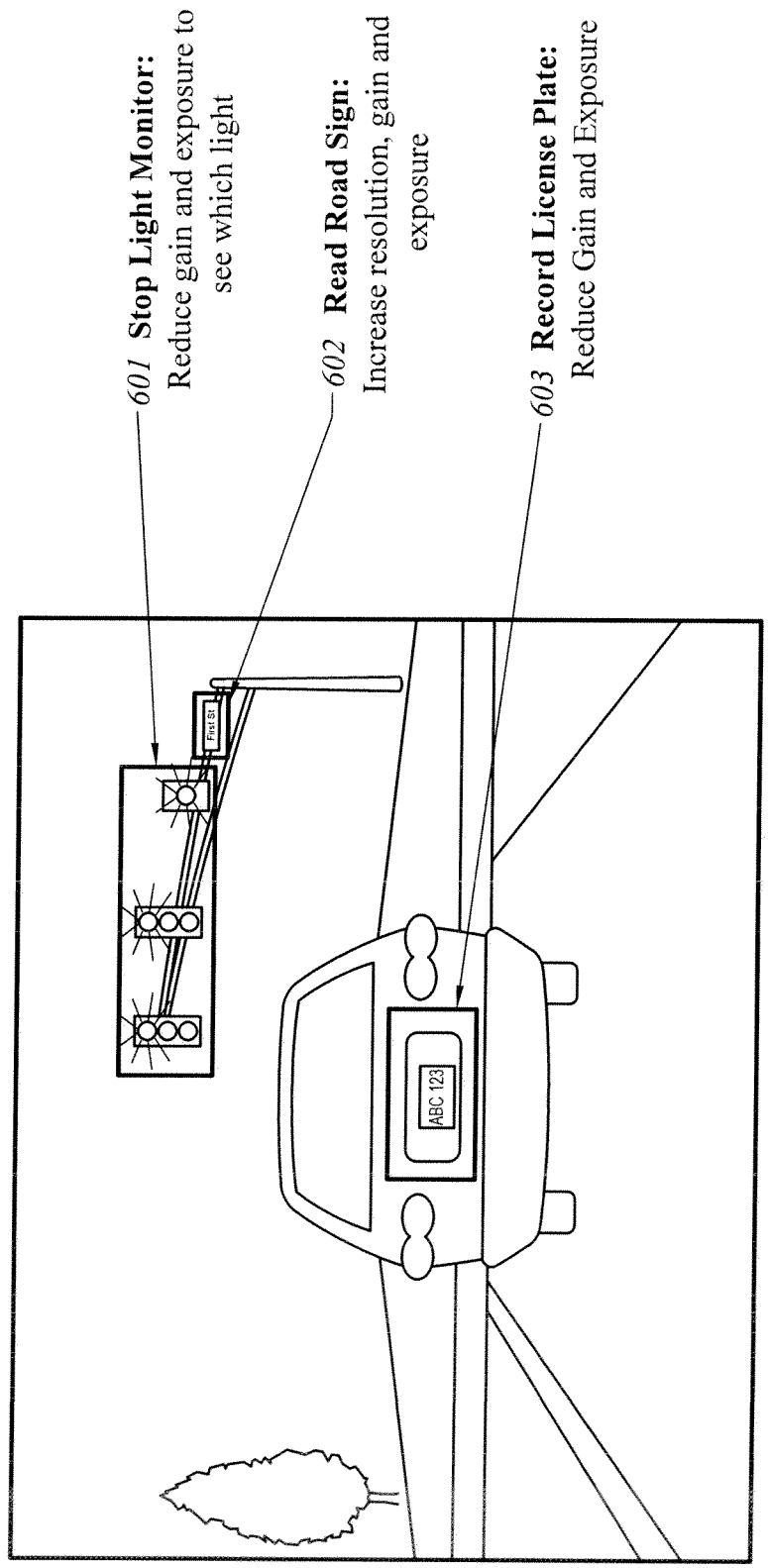
FIG. 6 illustrates an example of an image having multiple ROIs with different settings of gain, exposure, and resolution in accordance with one embodiment of the present invention.

FIG. 6 illustrates an example of an illustrative image in a forward-looking automobile camera application. The scene corresponds to a night driving example in which there is a car located a short distance ahead from a forward-looking automobile camera, a road sign positioned farther ahead in the distance, and a stop light. In this example the different illumination conditions would make it impractical to use a common exposure time to achieve reliable image recognition for every ROI. Moreover, in this example the minimum resolution required for reliable image recognition will differ in each ROI. A traffic light ROI 601 corresponds to a comparatively brightly lit region (compared to other objects under night time illumination) and requires a reduction in gain and exposure time to reliably identify which of three lights (red, green, or yellow) is illuminated. The road sign ROI 603 corresponds to a dimly lit ROI (under night time illumination) for a road sign located at a distance from the camera. Thus, in this example, the resolution, exposure time, and gain are increased for reliable image recognition of a road sign in ROI 602. The license plate ROI 603 corresponds to a license plate that is comparatively close to the camera and that is brightly lit by car headlights. Consequently, the resolution may be left at a default value but the gain and exposure time are reduced in ROI 603 to achieve reliable image recognition of the license plate.

Figure 7:
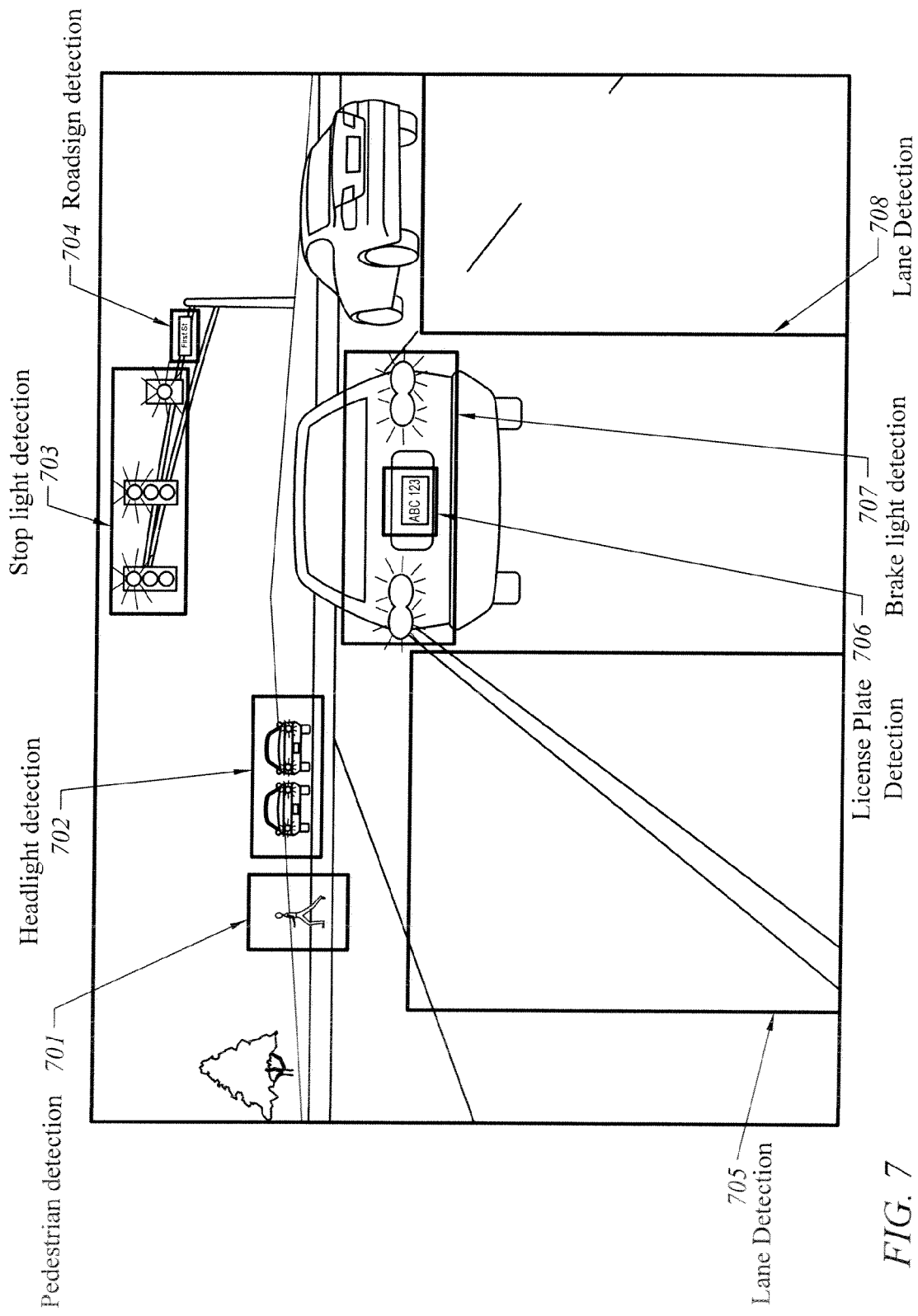
FIG. 7 illustrates another example of an illustrative scene for a forward looking automobile camera application in which multiple ROIs are supported in accordance with one embodiment of the present invention.

FIG. 7 illustrates another example of an illustrative scene for a forward looking automobile camera application in which multiple ROIs are supported. In this example the image recognition ROIs can include pedestrian detection ROI 701, headlight detection ROI 702, stop light detection ROI 703, road sign detection ROI 704, lane detection ROI 705, license plate detection ROI 706, brake light detection ROI 707, and lane detection ROI 708. Note that in this example the illumination of objects within each ROI varies widely (e.g., the pedestrian ROI 701 is dimly lit whereas the brake light ROI 707 is brightly lit). Additionally, note that relative distances of ROIs from the camera varies. For example, the pedestrian ROI 701 is located farther away from the camera than the license plate ROI 706. Moreover, in an automobile safety application, each image recognition task may have a different desired minimum detection distance. Consequently, it will be understood that independently adjusting pixel exposure time, gain, and resolution in multiple ROIs permits a suite of different automobile safety applications to be supported.

Embodiments of the present invention have numerous automotive applications, to either replace or enhance conventional radar collision avoidance systems. For night vision applications, an infrared light source may be used to perform collision detection/avoidance actions.

While examples of applications have been provided of automobile applications, it will be understood that other applications are contemplated for embodiments of the image sensing system of the present invention in which there are two or more ROIs and/or a need to adjust resolution in a single ROI. As one example, an embodiment of the image sensing system may be used to monitor a road or highway. In such road monitoring applications, license plate detection may be desirable. Additionally, in road monitoring applications it may be useful to monitor other aspects of the cars and the road, such as detecting potential road hazards. As one example of a road monitoring application, an image sensing system monitoring a car pool lane could monitor information associated with vehicles in the car pool lane (e.g., detection of the number of occupants of a car driving in a car pool lane) and also support license plate detection. In another embodiment, the image sensing system is used for security applications. In security applications it may be desirable to selectively adjust resolution in a ROI, such as a ROI corresponding to a person's face. Additionally, in many security applications the illumination will vary across a frame and there may be different ROIs corresponding to different image detection tasks. For example, in a security application the image detection tasks could include detecting cars, pedestrians, and trucks entering a site and under a variety of illumination conditions.

As previously described, some of the operations performed on the image processor and/or the image processor may be implemented as software sub-modules. Consequently, it will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An image sensing system, comprising:
    an image sensor having an array of pixels to capture an image;
    a controller to independently set image sensor parameters in two or more different portions of the image sensor corresponding to a plurality of regions of interest with the controller selecting default image sensor parameters in other portions of the image outside of the plurality of regions of interest; and
    a processor receiving image data from the image sensor, the processor identifying regions of interest, the processor comprising a plurality of sub-modules each supporting a respective region of interest, the plurality of sub-modules providing control signals to the image sensor to selectively adjust image sensor parameters in each of the plurality of regions of interest according to an image recognition criterion,
    wherein the captured image comprises:
        two or more different portions having two or more set resolutions and at least one additional portion non-overlapping with the two or more different portion and having a lower default resolution,
        an average pixel data rate that is lower than that of an image having full high resolution mode,
        an amount of pixel data which is less than that of the full high resolution mode image, and
    wherein the image sensor parameters comprise resolution, exposure, and gain.

2. The image sensing system of claim 1, wherein
    the controller independently sets a local pixel exposure time and pixel resolution in each of the plurality of regions of interest,
    the controller selects a minimum resolution and pixel exposure time in other portions of the image outside of the plurality of regions of interest, and
    an amount of image data received by the processor from the image sensor for a given image cannot exceed an amount of data contained in the array of pixels.

3. The image sensing system of claim 2, wherein the controller selects resolution by selecting a pixel sub-sampling rate.

4. The image sensing system of claim 2, wherein a minimum pixel resolution is at least a factor of four lower than a maximum image sensor resolution for a region of interest.

5. The image sensing system of claim 2, wherein a minimum pixel resolution is at least a factor of ten lower than a maximum image sensor resolution for a region of interest.

6. The image sensing system of claim 2, wherein for the plurality of regions of interest, each region of interest has the gain, exposure, and resolution independently selected based on an image recognition detection task.

7. The image sensing system of claim 6, wherein each image recognition detection task is a forward looking camera automobile detection task selected from the group consisting of pedestrian detection, headlight detection, stop light detection, road sign detection, license plate detection, brake light detection, and lane detection.

8. The image sensing system of claim 2, the system further comprising an infrared light source illuminating an object for capturing the images.

9. The image sensing system of claim 2, wherein exposure time in regions of interest is based on at least one of an average value or a histogram.

10. The image sensing system of claim 2, wherein resolution in a region of interest is iteratively increased in steps until an image recognition criterion is satisfied.

11. The image sensing system of claim 2, wherein resolution in a region of interest is increased from the minimum image resolution to a maximum image resolution.

12. An image sensing system, comprising:
    an image sensor having an array of pixels to capture an image;
    a controller to selectively adjust a pixel resolution and exposure time in two or more different portions of the image sensor corresponding to regions of interest of the captured image in response to control signals according to an image recognition criterion; and
    an image processor for receiving pixel data from the image sensor and analyzing images, the image processor including a plurality of sub-modules to provide the control signals,
    the image sensor having a maximum achievable pixel resolution determined by the array of pixels with the image sensor providing pixel data at a reduced pixel resolution in areas outside of regions of interest to reduce an average data rate of pixel data output from the image sensor for processing,
    wherein the captured image comprises:
        two or more different portions having two or more set resolutions and at least one additional portion additional portion non-overlapping with the two or more different portion and having a lower default resolution,
        an average pixel data rate that is lower than that of an image having full high resolution mode,
        an amount of pixel data which is less than that of the full high resolution mode image.

13. The image sensing system of claim 12, wherein said image sensor sub-samples pixels in areas outside of regions of interest.

14. The image sensing system of claim 13, wherein said image sensor increases pixel resolution in a selected region of interest by selectively increasing the sub-sampling rate in the selected region of interest.

15. An image sensing system, comprising:
    an image sensor having an array of pixels to capture images and including a controller to independently set a local pixel exposure time and pixel resolution in two or more different portions of the image sensor corresponding to a plurality of regions of interest of a captured image, the image sensor having a maximum achievable pixel resolution determined by the array of pixels with the image sensor providing pixel data at a reduced pixel resolution in areas outside of regions of interest to reduce an average data rate of pixel data output from the image sensor for processing; and
    an image processor including image analysis modules to support a plurality of different automobile image recognition detection tasks, the image processor receiving image data from the image sensor, identifying regions of interest for the different image recognition detection tasks, the image processor comprising a plurality of sub-modules for determining adjustments to exposure time, resolution, and gain for each region of interest to perform a selected image recognition detection task, and providing control signals to the image sensor to selectively adjust the resolution and exposure time in each region of interest according to an image recognition criterion, wherein the captured image comprises:
two or more different portions having two or more set resolutions and at least one additional portion non-overlapping with the two or more different portion and having a lower default resolution,
an average pixel data rate that is lower than that of an image having full high resolution mode,
an amount of pixel data which is less than that of the full high resolution mode image.

16. The image sensing system of claim 15, wherein the automobile image recognition detection tasks are selected from the group consisting of pedestrian detection, headlight detection, stop light detection, road sign detection, license plate detection, brake light detection, and lane detection.

17. An image sensing system to support forward-looking automobile camera applications under illumination conditions in which there is a large range of variation in light intensity from different objects in an image, comprising:
an image sensor having an array of pixels to capture images and including a controller to independently set a local pixel exposure time and gain in two or more different portions of the image sensor corresponding to multiple regions of interest of a captured image; and
an image processor including image analysis modules to support multiple different automobile image recognition detection tasks, the image processor receiving image data from the image sensor, identifying regions of interest for the different image recognition detection tasks, the image processor comprising a plurality of sub-modules for determining adjustments to exposure time and gain for each region of interest to perform a selected image recognition detection task, and providing control signals to the image sensor to selectively adjust the pixel exposure time and gain in each region of interest according to an image recognition criterion, wherein the captured image comprises:
two or more different portions having two or more set resolutions and at least one additional portion non-overlapping with the two or more different portion and having a lower default resolution,
an average pixel data rate that is lower than that of an image having full high resolution mode.

18. The image sensing system of claim 17, wherein the automobile image recognition detection tasks are selected from the group consisting of pedestrian detection, headlight detection, stop light detection, road sign detection, license plate detection, brake light detection, and lane detection.

19. A method of operating an image sensor coupled to a processor comprising a plurality of sub-modules, comprising:
capturing an image;
identifying regions of interest in the captured image, each region of interest corresponding to an image recognition detection task, each region of interest not-overlapping with each other region of interest;
for each region of interest, selecting a minimum pixel resolution, pixel exposure time, and pixel gain based on the corresponding image recognition detection task; and
adjusting pixel resolution, pixel exposure time, and pixel gain in two or more different portions of the image sensor corresponding to the regions of interest based on control signals from the plurality of sub-modules,
wherein at least two of the regions of interest have at least two set resolutions and at least one additional region of interest is non-overlapping with the at least two of the regions of interest and has a lower default resolution, and
wherein the captured image comprises:
an average pixel data rate that is lower than that of an image having full high resolution mode, and
an amount of pixel data which is less than that of the full high resolution mode image.

20. The method of claim 19, further comprising selecting a pixel resolution in image areas outside of regions of interest to have a reduced pixel resolution.

21. The method of claim 19, wherein said adjusting is performed iteratively over a sequence of images frames until an image recognition criterion is satisfied for each region of interest.

22. The image sensing system of claim 1, wherein the image sensor parameters are selectively adjusted iteratively over a sequence of images until the image recognition criterion is satisfied for each region of interest.

* * * * *